3,746,609
LAMINATE OF SMA COPOLYMER AND
POLYAMIDE
Karl Stange, Hambach, Helmut Jenne, Schriesheim, Hans-Peter Weiss, Altrip, and Ulrich Koenig, Ludwigshafen, Germany, assignors to Badische Anilin- & Soda-Fabrik Aktiengesellschaft, Ludwigshafen (Rhine), Germany
No Drawing. Filed Oct. 4, 1971, Ser. No. 186,422
Claims priority, application Germany, Oct. 8, 1970,
P 20 49 380.5
Int. Cl. B32b 27/34, 27/32, 27/30, 27/08; C08g 41/04
U.S. Cl. 161—165
4 Claims

ABSTRACT OF THE DISCLOSURE

Laminates of a styrene polymer A and a polyamide B, the styrene polymer A being a copolymer of styrene and the anhydride of an ethylenically unsaturated dicarboxylic acid which may if desired have been modified with a butadiene or acrylic ester polymer. The laminates are suitable for the production of film and sheeting, for example packaging film.

---

The invention relates to laminates of polyamides and copolymers of styrene and the anhydride of an ethylenically unsaturated dicarboxylic acid.

Polyamides and pure polystyrene are not compatible with one another. When these materials are combined by coextrusion through superjacent nozzles, or when one is coated with a solution of the other and the solvent evaporated, the assembly separates upon only slight mechanical stress.

Since the combination of styrene polymers and polyamides, particularly in the form of film or sheeting, promises a series of advantages, the invention has as its object the production of composites from polyamides and styrene polymers.

We have now found that surprisingly this object is achieved without adhesion promoters or bonding agents (i.e. by direct combination) by using, as the styrene polymer, a copolymer of styrene with the anhydride of an ethylenically unsaturated dicarboxylic acid having in all a maximum of sixteen carbon atoms.

The copolymer should according to the invention contain about 98 to 51.5% by weight of styrene and about 2 to 48.5% by weight of the anhydride of the ethylenically unsaturated dicarboxylic acid, and preferably from 90 to 51.5% by weight of styrene and from 10 to 48.5% by weight of maleic anhydride. The unsaturated dicarboxylic acid may be for example maleic acid, fumaric acid or itaconic acid. The copolymer ply may if desired contain up to 50% by weight of a compatible elastomeric component based on butadiene or acrylic ester.

The elastomeric component should have a glass temperature (according to K. H. Illers, Kolloid-Zeitung, 176, 110 (1961)) of below −20° C. It should contain at least 30% by weight of units of butadiene or an acrylic ester having up to eight carbon atoms in the alcohol radical. Diolefin polymers of acrylic ester polymers, which may be crosslinked, are thus suitable. Elastomeric block copolymers, for example of butadiene and styrene, may also be used. It is preferred however to use graft copolymers of from 10 to 50% by weight of styrene and acrylonitrile onto 90 to 50% by weight of a butadiene or acrylic ester rubber.

Examples of polyamides which may be used according to the invention are polylactams such as polycaprolactam, polycaprylolactam, polyaurolactam and polyenantholactam, nylon-6,6, nylon-6,10, nylon-6,12 and poly-11-aminoundecanoic acid and mixtures of these polymers and/or copolymers from the starting materials on which these polyamides are based.

Laminates made by the process according to the invention are distinguished by excellent bond strength and are resistant to boiling. They have a number of advantages over the starting materials. In comparison with styrene polymers the laminates have greater heat distortion strength and higher resistance to non-polar solvents and are less permeable to oil, grease and flavors. Moreover gas permeability, particularly for oxygen, is lower. As compared with polyamides, the laminates exhibit lower water vapor permeability and higher acid resistance. The laminates are transparent and can be deep drawn and offer on the polyamide side high resistance to scratching and abrasion and also antistatic properties, and on the polystyrene side high surface hardness and low resistance to adhering and sliding friction, and on both sides the possibility of vacuum metallization.

The thermoplastics used in the individual plies may contain conventional additives such as fillers, lubricants, pigments and/or stabilizers.

Laminates according to the invention may be made by various methods:

They are preferably prepared by extrusion at material temperatures of from 240° to 320° C., the individual components being coextruded from separate dies. The dies may be sheeting dies of which at least two have to be arranged parallel to one another or tubular dies having at least two concentric gaps.

The molten individual plies may be united inside the dies or shortly after the film has left the same. Appropriate designs of extruder heads are known.

The plies while in the plastic condition may be pressed together by a conventional method, as for example by the action of compressed air or by means of pairs of rollers. The thickness of the individual plies can be varied by varying the extruder speed. The thickness of the plies depends mainly on the particular application. In the case of sheeting, ply thicknesses of from 0.1 to 20 mm. are suitable.

The laminates may also be prepared by brushing or spraying a finished sheet of one ply, particularly of the abovementioned styrene polymers, with a solution of the polymer of the other ply and then solidifying the applied layer by evaporation of the solvent.

Both thermoplastics in the form of film or sheeting may also be pressed together and heated for a short time at a temperature of more than 200° up to 260° C.

The two last-mentioned methods are appropriate when the thickness of the polyamide ply is to be kept as low as possible.

By the last-mentioned method, ply thicknesses of down to about 5 millimicrons are achieved, whereas by extrusion the lower limit is about 15 millimicrons.

Laminates according to the invention may contain (in addition to the styrene copolymer ply immediately bonded to the polyamide ply) further plies or support plies, as for example fabric, netting, non-woven fabric or metal plies.

One of the two plies may also be used as an adhesion promoter for a third ply. For example in this way a polyamide ply B may be bonded by means of the copolymer ply A with a ply of another styrene polymer which is compatible with copolymer A. In this way polyamide may be bonded with polystyrene, impact-resistant polystyrene and ABS polymers.

The following examples illustrate the invention.

EXAMPLE 1

A film having a thickness of 0.150 mm. of a styrene maleic anhydride copolymer having a content of 10% by weight of polymerized units of maleic anhydride is laid on a film having a thickness of 0.150 mm. of polycaprolactam and heated at 230° C. in a platen press for three minutes and then pressed for five minutes at a specific pressure of 25 kg./cm.²

The sheet obtained has a tensile strength of 630 kg./cm.², a tear resistance of 610 kg./cm.² and an elongation at break of 80%.

EXAMPLE 2

A copolymer of styrene with 10% by weight of maleic anhydride is mixed with a graft copolymer of 25% by weight of styrene and acrylonitrile (in the ratio 75:25) onto 75% by weight of an elastomeric copolymer of 60% by weight of n-butyl acrylate and 40% by weight of butadiene for ten minutes on a roller heated to 200° C. The ratio by weight of copolymer to graft rubber is 55:45.

A film having a thickness of 0.15 mm. is prepared from the mixture by the method described in Example 1 and compressed with a film of nylon-6,6 which also has a thickness of 0.15 mm.

The plies adhere firmly to one another.

EXAMPLE 3

A copolymer of styrene and 13% by weight of maleic anhydride is mixed in a ratio by weight of 77:23 with a graft rubber of 40% by weight of styrene and acrylonitrile (in a ratio by weight of 75:25) onto 60% by weight of a partly crosslinked n-butyl acrylate rubber in an extruder at 240° C.

Two-ply sheeting is prepared by coextrusion by plasticizing the elasticized styrene polymer and the polycaprolactam separately in extruders at a temperature of the material of 240° C. and extruding them through a common sheeting die having an orifice 1 mm. wide and 50 mm. long.

We claim:
1. A laminate comprising at least two plies A and B wherein ply A contains 100 to 50 parts by weight of a copolymer of 98 to 51.5% by weight of styrene with 2 to 48.5% by weight of the anhydride of an ethylenically unsaturated dicarboxylic acid having a maximum of sixteen carbon atoms and 0 to 50 parts by weight of an elastomeric component which is compatible with the copolymer, which has a glass temperature lower than −20° C. and which contains polymerized units of at least 30% by weight of butadiene or an acrylic ester having a maximum of eight carbon atoms in the alcohol radical; and ply B is a polyamide layer bonded immediately to ply A.

2. A laminate as claimed in claim 1 wherein ply A contains:
100 to 50 parts by weight of a copolymer of
  90 to 51.5% by weight of styrene and
  10 to 48.5% by weight of maleic anhydride and
0 to 50 parts by weight of a graft copolymer of
  10 to 50% by weight of styrene and acrylonitrile onto
  90 to 50% by weight of a butadiene or acrylic ester rubber.

3. A laminate as claimed in claim 1 having a thickness of from 0.1 to 20 mm.

4. A process for the production of a laminate as claimed in claim 1 wherein plies A and B are coextruded at a temperature of the material of from 240° to 320° C. and then pressed together in the plastic condition.

References Cited

UNITED STATES PATENTS

| | | | |
|---|---|---|---|
| 3,673,277 | 6/1972 | Schmitt et al. | 260—857 UN |
| 3,597,498 | 8/1971 | Christensen | 260—857 |
| 3,547,767 | 12/1970 | Keeling et al. | 161—270 |
| 3,682,768 | 8/1972 | Adams et al. | 161—253 |
| 3,497,574 | 2/1970 | Press | 260—897 |
| 3,051,597 | 8/1962 | Bushong et al. | 154—43 |
| 3,438,845 | 4/1969 | Cohen et al. | 161—165 |
| 3,654,069 | 4/1972 | Freudenberg | 161—254 |

GEORGE F. LESMES, Primary Examiner

W. R. DIXON, Jr., Assistant Examiner

U.S. Cl. X.R.

161—227, 214, 247, 253, 254, 255, 216, 256, 217; 260—78.5 BB, 857 UN